UNITED STATES PATENT OFFICE.

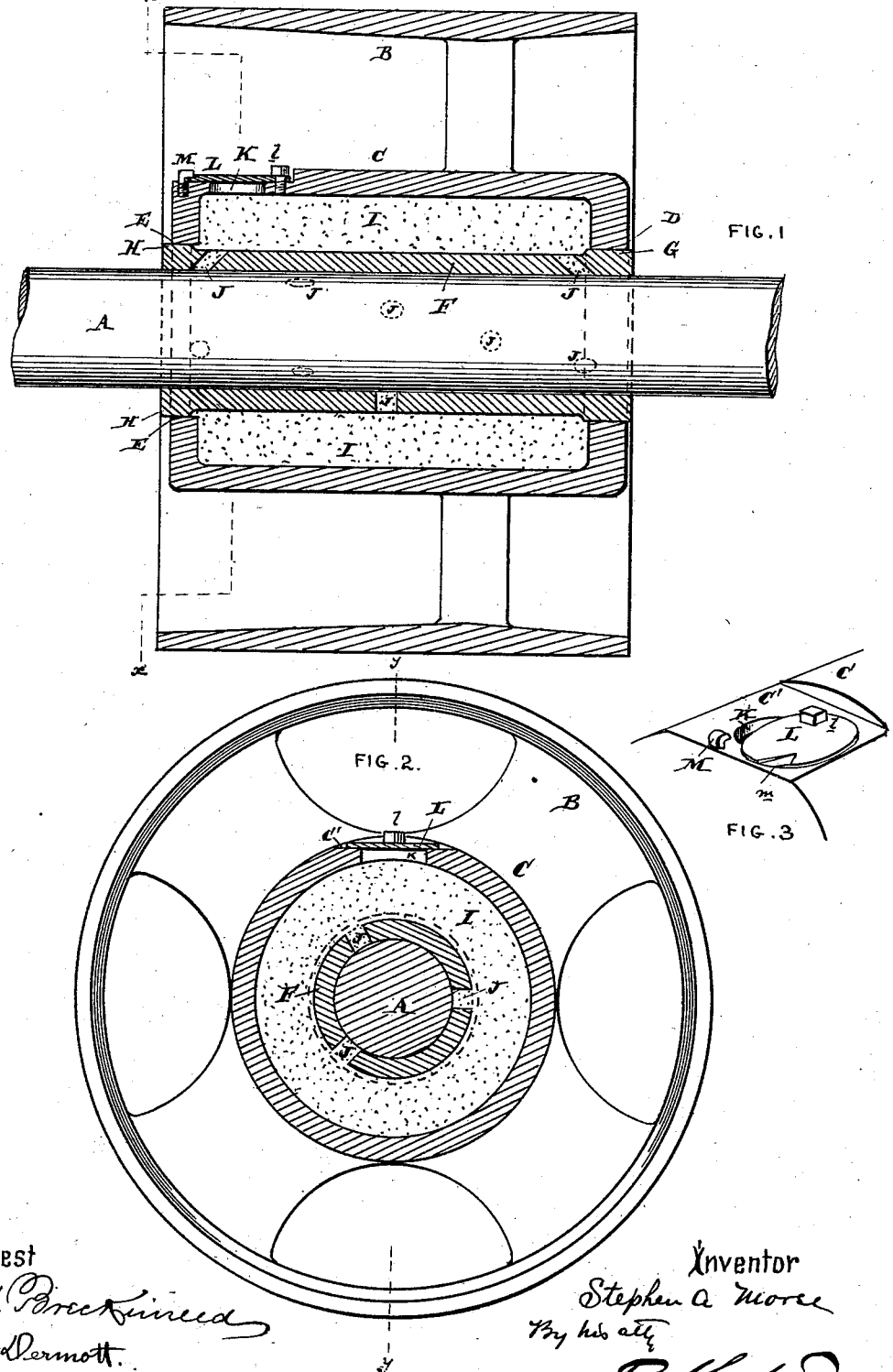

STEPHEN A. MORSE, OF PHILADELPHIA, PENNSYLVANIA.

LUBRICATOR FOR PULLEYS.

SPECIFICATION forming part of Letters Patent No. 373,940, dated November 29, 1887.

Application filed April 28, 1887. Serial No. 236,395. (No model.)

*To all whom it may concern:*

Be it known that I, STEPHEN A. MORSE, of the city and county of Philadelphia, and State of Pennsylvania, have invented an Improvement in Lubricators for Pulleys, of which the following is a specification.

My invention has reference to journals for pulleys, &c.; and it consists in certain improvements, all of which are fully set forth in the following specification and shown in the accompanying drawings, which form part thereof.

Heretofore it has been customary to lubricate journals by providing various devices adapted to project the oil toward the shaft while the pulley is revolving; but such devices are more or less complicated, and are unreliable, and are apt to get out of order.

My object is to overcome the existing defects in the means heretofore employed for causing the oil to flow toward the shaft in opposition to the action of centrifugal force, and also at the same time to produce an extremely simple, durable, and cheap construction of bearing.

In carrying out my invention I make the hub of the pulley hollow and insert through the same a tubular bearing having a series of oiling-apertures to supply the lubricant passing through the said bearing. Between the said bearing and hub is formed an annular chamber communicating with the apertures in the bearing, and this chamber is filled with a lubricant such as is known as "Albany Lubricant," or its equivalent. This lubricant is of the consistency of lard. The apertures through the bearing are sufficiently large that the lubricant in passing through may draw in more lubricant without any tendency of breaking the continuity of the supply. As the pulley revolves, the shaft runs in contact with the inner ends of the columns of lubricant extending through the apertures, and this creates a suction, causing the lubricant to be drawn down through the apertures in the journal. This action is the result of the suction created on the inner ends of the holes or next to the shaft while the atmospheric pressure acts upon the outer end of the column of lubricant.

In the drawings, Figure 1 is a sectional elevation of a pulley on its shaft on line $y\ y$ of Fig. 2, embodying my invention. Fig. 2 is a sectional elevation on line $x\ x$ of Fig. 1; and Fig. 3 is a perspective view of the means for filling the annular space with the lubricant.

A is the shaft, and B is the pulley.

C is the hub of the pulley, which is made hollow, with end walls bored out at E and D to preferably the same diameter.

F is the bearing, preferably made of brass or bronze, and is slightly enlarged on its ends H and G, which are turned to a driving fit with the apertures E and D. The distance between the enlarged parts H and G is preferably so proportioned that the end G may be inserted in the hole D before the end H reaches the hole E, to prevent any possibility of binding. This bearing is bored out to fit the shaft A, and is provided with a series of lubricating-holes, J, arranged preferably like spirals, and with the end holes pointing obliquely toward the ends of the bearing, to insure a proper distribution of the lubricant at these parts. The annular space I, formed between the hub C and the bearing F, is filled with lubricant through the aperture K, which has a tightly-fitting lid, L, resting upon a flattened part, C', of the hub, and pivoted thereto at $l$. This cover or plate L may also have an inclined face, $m$, adapted to catch under a hooked extension, M, to hold it down upon the face C'; but, while said fastening makes an ordinary tight joint, it does not exclude the atmosphere. Any other form of opening may be used, if desired. The lubricant, being of the consistency of lard, is not affected by centrifugal force, and in practice remains snugly up against the bearing F, and is drawn through the apertures J by suction and capillary attraction. These bearings are found to be most durable and are self-lubricating, and are further found to be far superior to any in which a fluid lubricant is used. They are far more clean, more easily kept filled, and will run for a longer period with a given charge of lubricant. In the case of idler-pulleys, where the shaft revolves in one direction and the pulley in the other direction, the frictional effect often exceeds one thousand revolutions a minute, and it therefore is of the utmost importance to provide a perfect self-lubricator which will not require much attention and yet perform its duty in a perfect manner.

It is evident that I do not limit myself to the mere details of construction, as they may be modified without departing from my invention.

I am aware that car wheels and pulleys have been made with lubricating-hubs, as is shown in Patents No. 71,535, of 1867, and No. 134,250, of 1872; but these devices are adapted to thin fluid oil or lubricant, and could not possibly work in the manner and for the purpose of my invention. These devices are intermittent in their action, applying the lubricant only when the wheel is at rest or just starting, whereas in my device the lubricant is applied when the pulley is running at a high speed, and not when at rest. This application of the lubricant when the pulley is rotating at high speed is necessary in idlers—such, for instance, as used on hoisting-machines.

In the above-specified patents centrifugal force acts to hold the oil away from the journal while running at high speed, while in my device centrifugal force has no effect in drawing away the lubricant from the bearing.

Having now described my invention, what I claim as new, and desire to secure by Letters Patent, is—

The combination of a pulley, having a hollow hub made with openings E D on its ends, with tubular sleeve-bearing F, having lubricating-apertures J and enlarged ends H and G to fit the parts E D, but separated a distance sufficient to enable the part G to enter hole D before part H enters hole E.

In testimony of which invention I hereunto set my hand.

STEPHEN A. MORSE.

Witnesses:
R. M. HUNTER,
RICHD. S. CHILD, Jr.